(12) United States Patent
Mann et al.

(10) Patent No.: US 11,186,897 B2
(45) Date of Patent: Nov. 30, 2021

(54) METHOD FOR PRODUCING ALUMINUM-SCANDIUM ALLOY AND REACTOR FOR IMPLEMENTING THE METHOD

(71) Applicant: United Company RUSAL Engineering and Technology Centre, LLC, Krasnoyarsk (RU)

(72) Inventors: Viktor Khrist'yanovich Mann, Krasnoyarsk (RU); Vitaliy Valer'evich Pingin, Krasnoyarsk (RU); Dmitriy Anatolevich Vinogradov, Krasnoyarsk (RU); Denis Sergeevich Khramov, Krasnoyarsk (RU)

(73) Assignee: UNITED COMPANY RUSAL ENGINEERING AND TECHNOLOGY CENTRE LLC, Krasnoyarsk (RU)

( * ) Notice: Subject to any disclaimer, the term of this patent is extended or adjusted under 35 U.S.C. 154(b) by 299 days.

(21) Appl. No.: 15/566,131

(22) PCT Filed: Apr. 21, 2016

(86) PCT No.: PCT/RU2016/000226
§ 371 (c)(1),
(2) Date: Oct. 12, 2017

(87) PCT Pub. No.: WO2016/171589
PCT Pub. Date: Oct. 27, 2016

(65) Prior Publication Data
US 2018/0087129 A1    Mar. 29, 2018

(30) Foreign Application Priority Data

Apr. 22, 2015   (RU) ............................ RU2015115260
Dec. 11, 2015   (RU) ............................ RU2015153433

(51) Int. Cl.
*C22C 1/02*   (2006.01)
*C22B 5/04*   (2006.01)
(Continued)

(52) U.S. Cl.
CPC ................ *C22C 1/026* (2013.01); *B22F 9/20* (2013.01); *C22B 5/04* (2013.01); *C22B 21/02* (2013.01);
(Continued)

(58) Field of Classification Search
None
See application file for complete search history.

(56) References Cited

FOREIGN PATENT DOCUMENTS

| | | | |
|---|---|---|---|
| CN | 1410599 A | * | 4/2003 |
| RU | 2010893 C1 | | 4/1994 |

(Continued)

OTHER PUBLICATIONS

Moskvitin et al. About the possibility of obtaining aluminum scandium ligature in aluminum electrolysis. Tsvetnye Metally 1998 vol. 7 p. 43-46. (Year: 1998).*

(Continued)

*Primary Examiner* — Keith D. Hendricks
*Assistant Examiner* — Joshua S Carpenter
(74) *Attorney, Agent, or Firm* — Hogan Lovells US LLP

(57) ABSTRACT

Disclosed herein are methods for producing an aluminum-scandium alloy comprising 0.41-4 wt % of scandium which can be used in industrial production setting. The method is carried out by melting aluminum and a mixture of salts comprising sodium, potassium and aluminum fluorides followed by performing simultaneously, while continuously supplying scandium oxide, an aluminothermic reduction of scandium from its oxide and an electrolytic decomposition of the formed alumina. Periodically, at least a portion of the produced alloy is removed, aluminum is then charged, and (Continued)

the process of alloy production is continued while supplying scandium oxide. Also disclosed is a reactor for producing an aluminum-scandium alloy pursuant to the methods described herein.

20 Claims, 1 Drawing Sheet

(51) Int. Cl.
| | |
|---|---|
| *C25C 3/12* | (2006.01) |
| *C25C 3/06* | (2006.01) |
| *C22B 21/02* | (2006.01) |
| *C22C 21/00* | (2006.01) |
| *F27B 14/06* | (2006.01) |
| *C25C 3/18* | (2006.01) |
| *F27B 14/10* | (2006.01) |
| *B22F 9/20* | (2006.01) |

(52) U.S. Cl.
CPC ............... *C22C 1/02* (2013.01); *C22C 21/00* (2013.01); *C25C 3/06* (2013.01); *C25C 3/125* (2013.01); *C25C 3/18* (2013.01); *F27B 14/06* (2013.01); *F27B 14/10* (2013.01); *Y02P 10/25* (2015.11)

(56) References Cited

FOREIGN PATENT DOCUMENTS

| | | | |
|---|---|---|---|
| RU | 2124574 C1 | 1/1999 | |
| RU | 2213795 C1 | 10/2003 | |
| RU | 2361941 C1 | 7/2009 | |
| WO | 2006079353 A1 | 8/2006 | |
| WO | WO-2006079353 A1 * | 8/2006 | ............... C25C 3/36 |

OTHER PUBLICATIONS

Totten et al. Handbook of Aluminum. Ch 2—Smelting of Aluminum. p. 46-78. CRC Press (2003) (Year: 2003).*
Espacenet translation of WO2006079353 retrieved on Sep. 12, 2019 (Year: 2006).*
Liu et al. Processing Al-Sc Alloys at Liquid Aluminum Cathode in KF-AlF3 Molten Salt. ECS Transactions 50 (11) p. 483-489 (2012) (Year: 2012).*
Shtefanyuk et al. Production of Al-Sc Alloy by Electrolysis of Cryolite-Scandium Oxide Melts. Light Metals 2015 (Feb. 16, 2015) John Wiley & Sons, p. 589-593 (Year: 2015).*
USPTO translation of Moskvitin et al. About the possibility of obtaining aluminum scandium ligature in aluminum electrolysis. Tsvetnye Metally 1998 vol. 7 p. 43-46. (Year: 1998).*
USPTO provided translation of Moskvitin et al. About the possibility of obtaining aluminum scandium ligature in aluminum electrolysis. Tsvetnye Metally 1998 vol. 7 p. 43-46. (Year: 1998).*
Xu, Cong, et al. "Preparation of Al-Sc master alloy by aluminothermic reaction with special molten salt." ICAA13 Pittsburgh. Springer, Cham, 2012. 195-200. (Year: 2012).*
European Search Report issued in Application No. PCT/RU2016/000226 dated Sep. 17, 2018.
Shtefanyuk et al., "Production of Al-Sc Alloy by Electrolysis of Cryolite-Scandium Oxide Melts," Light Metals 2015, Feb. 16, 2015.
Moskvitin et al., "About the possibility of obtaining of aluminium scandium ligature in aluminium electrolysis," Cvetnye Metally (Tsvetnye Metally), Moskva: Gos Ob'Edinnoe Naua No-Technia Eskoe Izdat, RU, vol. 7, Jan. 1, 1998, pp. 43-46.
Sverdlin, "Introduction to Aluminum in: Handbook of Aluminum: Physical Metallurgy and Processes," Jan. 1, 2007, pp. 20-23.
International Search Report for PCT/RU2016/000226 dated Sep. 29, 2016.

* cited by examiner

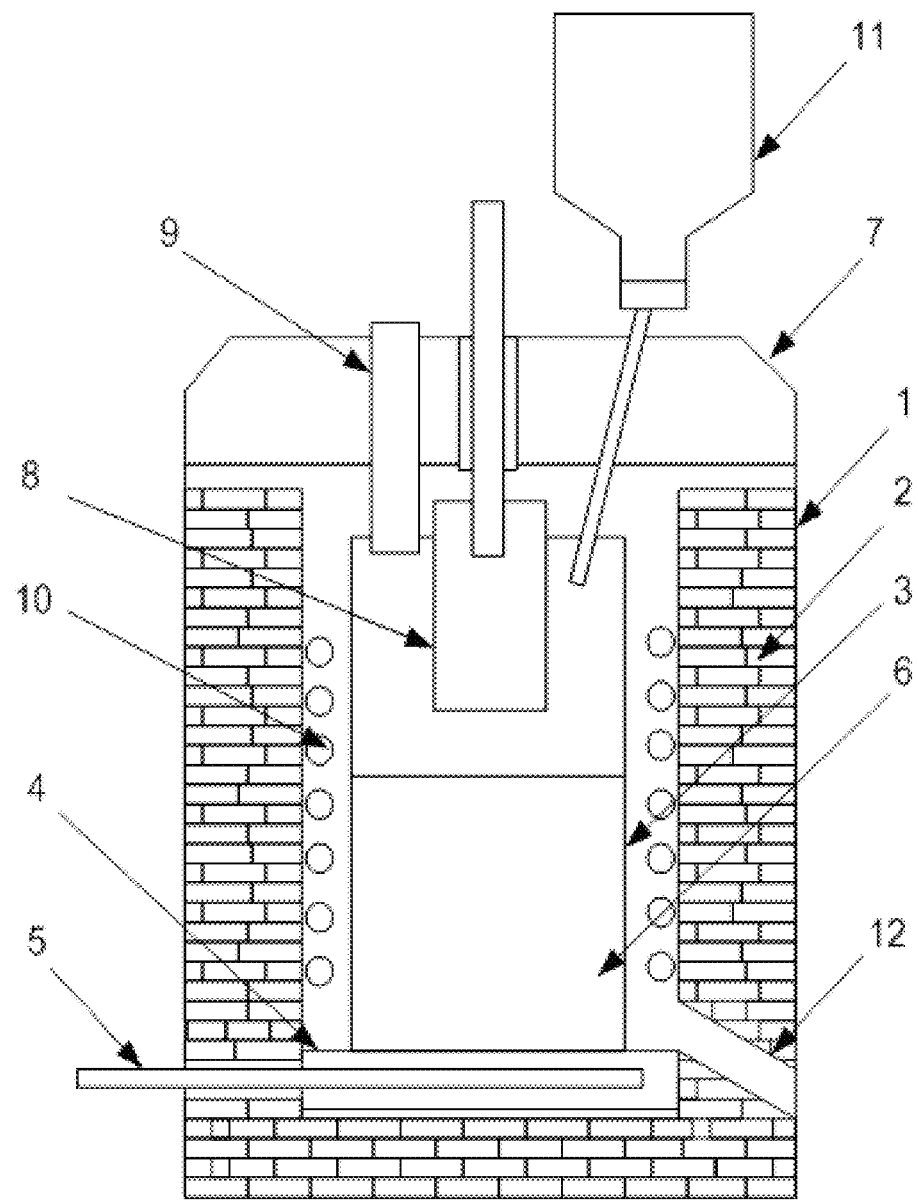

METHOD FOR PRODUCING ALUMINUM-SCANDIUM ALLOY AND REACTOR FOR IMPLEMENTING THE METHOD

This application is a U.S. National Phase under 35 U.S.C. § 371 of International Application PCT/RU2016/000226, filed on Apr. 21, 2016, which claims priority to RU application, 20150115260, filed on Apr. 22, 2015, and RU application, 20150153433, filed on Dec. 11, 2015. All publications, patents, patent applications, databases and other references cited in this application, all related applications referenced herein, and all references cited therein, are incorporated by reference in their entirety as if restated here in full and as if each individual publication, patent, patent application, database or other reference were specifically and individually indicated to be incorporated by reference.

TECHNICAL FIELD

The invention relates to nonferrous metallurgy and can be used for producing an aluminum-scandium alloy containing 0.41-4 wt. % of scandium in aluminum industrial production setting. It is known that aluminum-scandium alloys are much in demand in the automotive, aircraft construction and aerospace industries, with the demand for such alloys growing year after year.

BACKGROUND OF THE INVENTION

A method for producing an aluminum-scandium alloy is known, said method comprising preparing two aluminum batches (for example, in vacuum furnaces) and adding a furnace-charge containing scandium fluoride, magnesium fluoride and potassium chloride to one of the batches. After that, both batches of metal are mixed together while an inert gas is simultaneously supplied (RU application No. 2009134930, C22C 1/03, Mar. 27, 2011).

The disadvantages of this method include its technological complexity, aluminum batching and the use of vacuum or inert ambient.

Known is a method for producing an aluminum alloy containing 0.20-0.50 wt. % of scandium by electrolysis of $NaF$—$AlF_3$—$Al_2O_3$—$LiF$ melt with scandium oxide added thereto (Proc. $3^{rd}$ International Symposium on High-Temperature Metallurgical Processing, 2012, pp. 243-250). During electrolysis, cathode deposition of aluminum and scandium on aluminum occurs at a cathode current density of up to 1 $A/cm^2$ and a temperature of 950° C.

A disadvantage of this method includes the use of an expensive salt, lithium fluoride amounting to 5% of the total melt weight.

Known is a method for producing an aluminum-scandium alloy said method comprising melting a charge including potassium chloride, sodium fluorides, aluminum chiolite ($Na_5[Al_3F_{14}]$) and scandium oxide, and keeping the same in contact with liquid aluminum from the charge (Degtyar V. A., Polyak E. N., "Scandium Oxide Reduction from KCl—NaF—$AlF_3$—$Sc_2O_3$ Melt", Russian Scientific and Technical Conference "New Materials and Technologies", "Metallic Materials, Methods for Processing the Same", Synopsis, M: 1994, p. 102).

A disadvantage of the known method is a significant formation of oxyfluorides (ScOF), insoluble scandium compounds turning into slag, which leads to scandium losses and a low yield of a suitable product (about 60%).

A method closest to the proposed method is the one for obtaining aluminum-scandium alloys and master alloys with a scandium content of 0.4 wt. % (Nonferrous Metals, 1998, No. 7, pp. 43-46) by electrolysis of a cryolite-alumina melt ($NaF$—$AlF_3$—$Al_2O_3$) with addition of scandium oxide.

The features common for the known and claimed methods are conducting electrolysis of a melt containing sodium fluoride, aluminum fluoride and scandium oxide, and carrying out aluminothermic scandium reduction.

The disadvantages of the known method include a relatively high process temperature (about 1000° C.), consumption of additional electricity for the scandium cathode deposition, relatively large losses of the alloying component, impossibility to set up a continuous process for producing an alloy because aluminum oxide formed during the aluminothermic reaction will accumulate in the melt sludging thereby the melt itself and aluminum.

Known in the art is an apparatus for producing an aluminum-strontium master alloy, comprising a bath with a bottom, an anode, a cathode, a current lead, a mixing means and additional electrodes coated with a material not interacting with electrolyte, wherein the cathode is made of liquid aluminum, the cathode current lead is coated with a material not interacting with the master alloy, the anode is provided with channels for the discharge of anode gases, and the bath at the bottom is provided with an orifice for discharging the master alloy (RU patent No. 2010893, C25C3/36, Apr. 15, 1994).

This device was selected by the inventors as a prototype.

A disadvantage of the known device is the impossibility to obtain an aluminum-scandium alloy therein and the complexity of its design.

Thus, it is clear that various approaches to producing an aluminum-scandium alloy are not devoid of drawbacks. Therefore, there remains a need for an improved method for producing an aluminum scandium alloy that solves one or more of the problems of the prior art.

It is an object of the present invention to provide a continuous, non-waste method for producing an aluminum scandium alloy that provides a high purity of the final product with a high level of scandium extraction, and also to provide a device that will enable an efficient non-waste production of an aluminum-scandium alloy and will have an easy-to-operate design.

SUMMARY OF THE INVENTION

The present invention provides a process for preparing an aluminum-scandium alloy containing 0.41-4 wt. % of scandium, comprising the following steps:

a) melting aluminum and a mixture of salts containing sodium, potassium and aluminum fluorides;

b) carrying out, while continuously supplying scandium oxide to the molten mixture of salts, simultaneous aluminothermic reduction of scandium from its oxide and electrolytic decomposition of the formed alumina, wherein the concentration of scandium oxide in the molten mixture of salts is maintained at 1 to 8 wt. %;

c) recovering at least a portion of the obtained aluminum-scandium alloy;

d) adding aluminum and repeating steps b)-c).

The claimed method provides regeneration of the oxide-halide melt comprising a mixture of fluorides and scandium oxide by electrolytic decomposition of the alumina formed during the reaction of alumina.

The proposed method enables the achievement of a technical effect consisting in lowering the temperature and energy consumption of the whole process while enabling the possibility to obtain a high purity alloy with a given composition and to achieve a high level of scandium extraction.

The scandium content in the aluminum scandium alloy obtained by the proposed method can be from 0.41 to 4% by weight of scandium, preferably from 0.5 to 3.5% by weight of scandium, preferably from 1 to 3% by weight of scandium, preferably from 1.5 to 2.5% by weight of scandium.

According to the proposed embodiments of the inventive method, the concentration of scandium oxide in the molten mixture of salts is maintained at 1 to 8 wt. %, preferably at 2 to 7 wt. %, preferably at 3 to 6 wt. %, preferably at 4 to 5 wt. %.

According to the proposed method, the prepared molten mixture of salts can be used in at least four aluminum-scandium alloy production cycles.

The content of sodium fluoride in the molten mixture of salts can be from 1 to 15 wt. %. The process for producing the alloy is preferably conducted at a temperature of 800-950° C., and the cryolite ratio (KR) of the molten mixture of salts, defined as the molar ratio of the sum of potassium fluorides (KF) and sodium fluorides (NaF) to aluminum fluoride (AlF3), is preferably maintained at 1.3-1.7.

According to the present invention, electrolytic decomposition of alumina is carried out at a temperature maintained at 800-950° C., and anode and cathode current densities of 0.3-2 A/cm$^2$ and 0.4-1.8 A/cm$^2$, respectively. The duration of the process for obtaining an aluminum-scandium alloy (from loading and start of melting pure aluminum and a mixture of salts to discharging the obtained alloy) can vary from 0.5 to 5 hours.

The present invention also provides a reactor for producing an aluminum-scandium alloy by the said method, which comprises a housing lined on the inside with a refractory material and having a cover, at least one anode, a cathode and a current lead comprising a graphite block with blooms arranged therein, wherein a graphite crucible with heating elements provided on its outer side is arranged on the graphite block, and a dispenser for continuous supply of scandium oxide and a port for loading aluminum and discharging the alloy are arranged inside the cover.

The reactor can be represented by particular embodiments of its design.

The reactor may comprise a melt discharge outlet located at the bottom of the housing.

According to an embodiment of the claimed reactor, the reactor housing is made of steel, and the refractory material for lining the steel housing is a refractory brick.

Hereinafter, the present invention will be explained by way of specific exemplary embodiments thereof with reference to the drawings.

FIG. 1 is a schematic view of the claimed reactor for producing an aluminum-scandium alloy.

DETAILED DISCLOSURE OF THE INVENTION

FIG. 1 shows general view of the reactor for producing an aluminum-scandium alloy. The device comprise a steel housing 1 lined on the inside with a refractory material 2, a graphite crucible 3 mounted on a bottom graphite block 4 with blooms 5 arranged therein, which serves as a current lead to the cathode metal 6. A graphite anode 8 is mounted inside the reactor through the cover 7 which is also provided with an port 9 for loading aluminum and discharging the alloy. To maintain the required process temperature, the reactor is further provided with heating elements 10. The reactor contains a dispenser 11 for a continuous feed of scandium oxide into the melt. The reactor also has an emergency drain hole 12 for safe removal of the melt in the event of breakdown of the crucible 3. The essence of the proposed method is as follows. Upon contact of an oxide-halide melt containing potassium, sodium and aluminum fluorides as well scandium oxide in an amount of 1-8 wt. %, aluminothermic reduction of scandium oxide occurs, resulting in formation of an aluminum scandium alloy with a scandium content of 0.41 to 4 wt. %. At the same time, the concentration of scandium oxide decreases in the melt and the concentration aluminum oxide (alumina) increases.

The limitation of the scandium oxide content in the oxide-halide melt is due to the fact that the solubility of $Sc_2O_3$ in the molten KF—NaF—AlF$_3$ mixtures has values close to 8 wt. %.

The total chemical (aluminothermic) reaction of the process has the following form:

$$2Al+Sc_2O_3=2Sc+Al_2O_3 \quad (1)$$

The amount of scandium formed in aluminum is determined by the amount of scandium oxide ($Sc_2O_3$) in the oxide-halide melt, the contact time of the aluminum melt with the oxide-halide melt and the reaction rate constant (1).

For setting up a continuous process for producing an aluminum-scandium alloy, a portion of the obtained aluminum-scandium alloy is periodically discharged following which aluminum is added to the melt, in particular, a portion of molten aluminum is poured into the bulk of the discharged aluminum-scandium alloy. To obtain an aluminum-scandium alloy, scandium oxide is continuously fed while maintaining the concentration of scandium oxide in the oxide-halide melt at a level of 1 to 8% and alumina formed in the melt is subjected to electrolytic decomposition (electrolysis). Electrolysis is carried out at a temperature of 800-950° C. and the anode and cathode current densities of 0.3-2 A/cm$^2$ and 0.4-1.8 A/cm$^2$, respectively. The duration of the process for obtaining an aluminum-scandium alloy (from the start of melting loaded pure aluminum and the mixture of salts to discharging the obtained alloy) can vary from 0.5 to 5 hours depending on the requirement to scandium content in the obtained aluminum-scandium alloy.

The required current strength in the reactor is determined based on the amount of alumina formed as a result of the aluminothermic reaction. The amount of alumina formed is in turn dependent on the selected feed rate of scandium oxide and on the rate of discharging the obtained alloy.

The total reaction of electrolytic decomposition of aluminum oxide using a graphite anode and an aluminum cathode is as follows:

$$Al_2O_3+2C=2Al+CO+CO_2 \quad (2)$$

The method makes it possible to obtain an aluminum-scandium alloy at low temperatures (800-950° C.), wherein the alloy can be repeatedly obtained from the same melt by periodically replacing aluminum therein, which leads to simplifying the process and reducing energy consumption to maintain the process temperature. Reduction of the process temperature in the claimed method also leads to an increase in the ratio of scandium extraction.

The proposed process can be carried out in the proposed reactor as follows. Aluminum and a premix of salts containing potassium, sodium and aluminum fluorides are charged into a graphite crucible 3 of the reactor, heating elements 10 are turned on and aluminum and the mixture of salts are melted, wherein due to a difference in the densities of liquid aluminum and the molten mixture of salts, aluminum is collected at the bottom of the crucible, when the melt temperature reaches 800-950° C., a dispenser 11 is turned on by means of which scandium oxide is automatically fed continuously to the melt, electric current is simultaneously applied to regenerate the oxide-halide melt by electrolytic decomposition of aluminum oxide formed during the aluminothermic reaction. A portion of the obtained aluminum-scandium alloy is extracted from the crucible 3 through the aluminum charge and alloy discharge port 9, then aluminum, preferably molten aluminum, is added and the alloy production process goes on while continuously feeding scandium oxide and applying the electric current.

The implementation of the proposed method is illustrated by the following examples.

EXAMPLE 1

A mixture of $KF$—$NaF$—$AlF_3$ salts having KR=1.43 and a weight of 4100 g and grade A99 aluminum having a weight of 4670 g was placed in a graphite crucible and heated. After melting the mixture of salts and aluminum and reaching the desired temperature of 850° C., scandium oxide was added to the melt. The concentration of scandium oxide in the melt of salts was maintained at 4.2% by weight, based on the total weight of scandium oxide and the melt of salts (weight of the oxide-halide melt). Electrolysis was carried out at anode and cathode current densities of 1.6 $A/cm^2$ and 1.4 $A/cm^2$, respectively. The electrolysis time was 4 hours. The temperature in the reactor was further maintained by means of heating elements.

After 4 hours of electrolysis, the current was turned off and a portion of the obtained alloy was removed from the reactor crucible. The obtained alloy was analyzed for the content of scandium and impurities. The obtained alloy contained 2.1 wt. % of scandium with the total content of impurities not exceeding 0.18 wt. %.

To set up a continuous process, pure aluminum was charged to the reactor crucible, the melt temperature was adjusted to 850° C., and the process of producing the alloy was continued by maintaining the concentration of scandium oxide in the melt of salts at 4.2% wt. % and applying the electric current to decompose aluminum oxide (alumina) being formed.

EXAMPLE 2

A mixture of $KF$—$NaF$—$AlF_3$ salts having KR=1.33 and a weight of 4100 g and grade A99 aluminum having a weight of 4670 g was placed in a graphite crucible and heated. After melting the mixture of salts and aluminum and reaching the desired temperature of 810° C., scandium oxide was added to the melt. The concentration of scandium oxide in the molten salt was maintained at 6 wt. % (based on the total weight of scandium oxide and the melt of salts). Electrolysis was carried out at anode and cathode current density of 2 $A/cm^2$ and 1.8 $A/cm^2$, respectively. The electrolysis time was 5 hours. The temperature in the reactor was further maintained by means of heating elements.

After 5 hours of electrolysis, the current was turned off and a portion of the obtained aluminum-scandium alloy was removed from the reactor crucible. The obtained alloy was analyzed for the content of scandium and impurities. The obtained alloy contained 3% by weight of scandium with the total content of impurities not exceeding 0.21% by weight.

To set up a continuous process, pure aluminum was charged to the reactor crucible, the melt temperature was adjusted to 810° C., and the process of producing the alloy was continued by feeding scandium oxide and maintaining its concentration in the melt of salts at 6 wt. % and applying the electric current to decompose aluminum oxide (alumina) being formed.

EXAMPLE 3

A mixture of $KF$—$NaF$—$AlF_3$ salts having KR=1.6 and a weight of 4100 g and grade A99 aluminum having a weight of 4670 g was placed in a graphite crucible and heated. After melting the mixture of salts and aluminum and reaching the desired temperature of 880° C., scandium oxide was added to the melt. The concentration of scandium oxide in the molten salt was maintained at 2.8 wt. % (based on the total weight of scandium oxide and the melt of salts). Electrolysis was carried out at anode and cathode current density of 1.6 $A/cm^2$ and 1.4 $A/cm^2$, respectively. The electrolysis time was 1.5 hour. The temperature in the reactor was further maintained by means of heating elements.

After 1.5 hour of electrolysis, the current was turned off and a portion of the obtained aluminum-scandium alloy was removed from the reactor crucible. The obtained alloy was analyzed for the content of scandium and impurities. The obtained alloy contained 1.13 wt. % of scandium with the total content of impurities not exceeding 0.17 wt. %.

To set up a continuous process, pure aluminum was charged to the reactor crucible, the melt temperature was adjusted to 880° C., and the process of producing the alloy was continued by feeding scandium oxide and maintaining its concentration in the melt of salts at 2.8 wt. % and applying the electric current to decompose aluminum oxide (alumina) being formed.

EXAMPLE 4

A mixture of $KF$—$NaF$—$AlF_3$ salts having KR=1.48 and a weight of 4100 g and grade A99 aluminum having a weight of 4670 g was placed in a graphite crucible and heated. After melting the mixture of salts and aluminum and reaching the desired temperature of 860° C., scandium oxide was added to the melt. The concentration of scandium oxide in the molten salt was maintained at 5 wt. % (based on the total weight of scandium oxide and the melt of salts). Electrolysis was carried out at anode and cathode current density of 1.8 $A/cm^2$ and 1.6 $A/cm^2$, respectively. The electrolysis time was 5 hours. The temperature in the reactor was further maintained by means of heating elements.

After 5 hours of electrolysis, the current was turned off and a portion of the obtained aluminum-scandium alloy was removed from the reactor crucible. The obtained alloy was analyzed for the content of scandium and impurities. The obtained alloy contained 2 wt. % of scandium with the total content of impurities not exceeding 0.21 wt. %.

To set up a continuous process, pure aluminum was charged to the reactor crucible, the melt temperature was adjusted to 860° C., and the process of producing the alloy was continued by feeding scandium oxide and maintaining its concentration in the melt of salts at 5 wt. % and applying the electric current to decompose aluminum oxide (alumina) being formed.

EXAMPLE 5

A mixture of $KF$—$NaF$—$AlF_3$ salts having KR=1.68 and a weight of 4100 g and grade A99 aluminum having a weight of 4670 g was placed in a graphite crucible and heated. After melting the mixture of salts and aluminum and reaching the desired temperature of 920° C., scandium oxide was added to the melt. The concentration of scandium oxide in the molten salt was maintained at 3 wt. % (based on the total weight of scandium oxide and the melt of salts). Electrolysis was carried out at anode and cathode current density of 1.8 A/cm$^2$ and 1.6 A/cm$^2$, respectively. The electrolysis time was 4.4 hours. The temperature in the reactor was further maintained by means of heating elements.

After 4.4 hours of electrolysis, the current was turned off and a portion of the obtained aluminum-scandium alloy was removed from the reactor crucible. The obtained alloy was analyzed for the content of scandium and impurities. The obtained alloy contained 1.6 wt. % of scandium with the total content of impurities not exceeding 0.15 wt. %.

To set up a continuous process, pure aluminum was charged to the reactor crucible, the melt temperature was adjusted to 920° C., and the process of producing the alloy was continued by feeding scandium oxide and maintaining its concentration in the melt of salts at 3 wt. % and applying the electric current to decompose aluminum oxide (alumina) being formed.

EXAMPLE 6

A mixture of KF—NaF—AlF$_3$ salts having KR=1.5 and a weight of 4100 g and grade A99 aluminum having a weight of 4670 g was placed in a graphite crucible and heated. After melting the mixture of salts and aluminum and reaching the desired temperature of 870° C., scandium oxide was added to the melt. The concentration of scandium oxide in the molten salt was maintained at 8 wt. % (based on the total weight of scandium oxide and the melt of salts). Electrolysis was carried out at anode and cathode current density of 1.8 A/cm$^2$ and 1.6 A/cm$^2$, respectively. The electrolysis time was 4.4 hours. The temperature in the reactor was further maintained by means of heating elements.

After 4.4 hours of electrolysis, the current was turned off and a portion of the obtained aluminum-scandium alloy was removed from the reactor crucible. The obtained alloy was analyzed for the content of scandium and impurities. The obtained alloy contained 4 wt. % of scandium with the total content of impurities not exceeding 0.24 wt. %.

To set up a continuous process, pure aluminum was charged to the reactor crucible, the melt temperature was adjusted to 920° C., and the process of producing the alloy was continued by feeding scandium oxide and maintaining its concentration in the melt of salts at 8 wt. % and applying the electric current to decompose aluminum oxide (alumina) being formed.

EXAMPLE 7

A mixture of KF—NaF—AlF$_3$ salts having KR=1.48 and a weight of 4100 g and grade A99 aluminum having a weight of 4670 g was placed in a graphite crucible and heated. After melting the mixture of salts and aluminum and reaching the desired temperature of 850° C., scandium oxide was added to the melt. The concentration of scandium oxide in the molten salt was maintained at 1 wt. % (based on the total weight of scandium oxide and the melt of salts). Electrolysis was carried out at anode and cathode current density of 1.8 A/cm$^2$ and 1.6 A/cm$^2$, respectively. The electrolysis time was 1 hour. The temperature in the reactor was further maintained by means of heating elements.

After 1 hour of electrolysis, the current was turned off and a portion of the obtained aluminum-scandium alloy was removed from the reactor crucible. The obtained alloy was analyzed for the content of scandium and impurities. The obtained alloy contained 0.41 wt. % of scandium with the total content of impurities not exceeding 0.20 wt. %.

To set up a continuous process, pure aluminum was charged to the reactor crucible, the melt temperature was adjusted to 850° C., and the process of producing the alloy was continued by feeding scandium oxide and maintaining its concentration in the melt of salts at 1 wt. % and applying the electric current to decompose aluminum oxide (alumina) being formed.

The invention claimed is:

1. A method for producing an aluminum-scandium alloy having a scandium content of 0.41-4 wt. %, consisting of the following steps:
    (a) melting aluminum and a mixture of salts containing sodium, potassium and aluminum fluorides to form a mixture of molten aluminum and molten salt, wherein the molten salt contains sodium fluoride in an amount ranging from 1 up to and including 15 wt. %;
    (b) carrying out, while continuously supplying scandium oxide to the mixture of molten aluminum and molten salt, an aluminothermic reduction of scandium from its oxide and an electrolytic decomposition of alumina formed from this step (b) to form an aluminum-scandium alloy having a scandium content of 0.41-4 wt. %, wherein the concentration of scandium oxide in the molten salt is maintained in an amount ranging from 1 to 8 wt. %;
    (c) recovering at least a portion of aluminum-scandium alloy formed from steps (a)-(b);
    (d) adding aluminum to the mixture of molten aluminum and molten salt, without adding salts containing sodium, potassium and aluminum fluorides, and repeating steps (b)-(c) at least four times.

2. The method according to claim 1, characterized in that the method is carried out at a temperature of 800-950° C.

3. The method according to claim 1, characterized in that the cryolite ratio of the mixture of salts containing potassium, sodium and aluminum fluorides, is maintained within the range of 1.3 to 17.

4. The method according to claim 1, characterized in that electrolytic decomposition of alumina is carried out at an anode current density of 0.3-2 A/cm$^2$.

5. The method according to claim 1, characterized in that the electrolytic decomposition of the alumina is carried out at a cathodic current density of 0.4-1.8 A/cm$^2$.

6. The method according to claim 1, characterized in that its duration is from 30 minutes to 5 hours from the start of melting the aluminum and the mixture of salts to recovery of at least a part of the obtained aluminum-scandium alloy.

7. The method according to claim 1, characterized in that the scandium content in the obtained aluminum-scandium alloy is 0.5 to 15% by weight.

8. The method according to claim 1, characterized in that the scandium content in the obtained aluminum-scandium alloy is from 1 to 3% by weight.

9. The method according to claim 1, characterized in that the scandium content of the obtained aluminum-scandium alloy is from 1.5% to 2.5% by weight.

10. The method according to claim 1, characterized in that the concentration of scandium oxide in the molten salt is maintained at 2 to 7 wt. %.

11. The method according to claim 1, characterized in that the concentration of scandium oxide in the molten salt is maintained at 3 to 6 wt. %.

12. The method according to claim 1, characterized in that the concentration of scandium oxide in the molten salt is maintained at 4 to 5 wt. %.

13. A method for producing an aluminum-scandium alloy having a scandium content of 0.41-4 wt. %, comprising the following steps:
- (a) melting aluminum and a mixture of salts containing sodium, potassium and aluminum fluorides to form a mixture of molten aluminum and molten salt, wherein the molten salt contains sodium fluoride in an amount ranging from 1 up to and including 15 wt. %;
- (b) carrying out, while continuously supplying scandium oxide to the mixture of molten aluminum and molten salt, an aluminothermic reduction of scandium from its oxide and an electrolytic decomposition of alumina formed from this step (b) to form an aluminum-scandium alloy having a scandium content of 0.41-4 wt. %, wherein the concentration of scandium oxide in the molten salt is maintained in an amount ranging from 1 to 8 wt. %;
- (c) recovering at least a portion of aluminum-scandium alloy formed from steps (a)-(b);
- (d) adding aluminum to the mixture of molten aluminum and molten salt, without adding salts containing sodium, potassium, and aluminum flourides, and repeating steps (b)-(c) at least four times.

14. The method according to claim 13, characterized in that the method is carried out at a temperature of 800-950° C.

15. The method according to claim 13, characterized in that the cryolite ratio of the mixture of salts containing potassium, sodium and aluminum fluorides is maintained within the range of 1.3 to 1.7.

16. The method according to claim 13, characterized in that the electrolytic decomposition of the alumina is carried out at a cathodic current density of 0.4-1.8 $A/cm^2$.

17. The method according to claim 13, characterized in that its duration is from 30 minutes to 5 hours from the start of melting the aluminum and the mixture of salts to recovery of at least a part of the obtained aluminum-scandium alloy.

18. The method according to claim 13, characterized in that the scandium content of the obtained aluminum-scandium alloy is from 1.5% to 2.5% by weight.

19. The method according to claim 13, characterized in that the concentration of scandium oxide in the molten salt is maintained at 2 to 7 wt. %.

20. The method according to claim 13, characterized in that the concentration of scandium oxide in the molten salt is maintained at 4 to 5 wt %.

* * * * *